United States Patent [19]

Levitan

[11] Patent Number: 5,235,163
[45] Date of Patent: Aug. 10, 1993

[54] RESISTIVE CONTACT FOR RESIN-BASED HEATING ELEMENTS

[76] Inventor: David M. Levitan, 1450 Sand Pebble #107, Wheeling, Ill. 60090

[21] Appl. No.: 914,310

[22] Filed: Jul. 17, 1992

[51] Int. Cl.$^5$ .......................... H05B 3/08; B21B 27/06
[52] U.S. Cl. .................................... 219/541; 219/469; 219/543
[58] Field of Search ............... 219/541, 216, 469, 543, 219/203, 546, 464

[56] References Cited

U.S. PATENT DOCUMENTS

| | | | |
|---|---|---|---|
| 3,649,810 | 3/1972 | Tsuboi et al. | 219/216 |
| 3,952,696 | 4/1976 | Saupe | 118/60 |
| 4,628,187 | 12/1986 | Sekiguchi | 219/541 |
| 4,774,397 | 9/1988 | Grise | 219/541 |

FOREIGN PATENT DOCUMENTS

| | | | |
|---|---|---|---|
| 0027073 | 2/1991 | Japan | 219/216 |
| 9113748 | 9/1991 | World Int. Prop. O. | 219/216 |

*Primary Examiner*—Bruce A. Reynolds
*Assistant Examiner*—Michael D. Switzer
*Attorney, Agent, or Firm*—Kinzer, Plyer, Dorn McEachran and Jambor

[57] ABSTRACT

A heating element for a plastic film laminator has a cylindrical base member. A heating layer of conductive resin such as conductive silicone is molded to the base member. An outer layer of dielectric material may cover the heating layer. Resistive electrical contacts are connected to the heating layer. An electrical power supply is connectable to the contacts. The resistive contacts create a voltage drop within the contact along the axis of current flow. This lowers the current density at the interfaces of the contacts and heating layer to prevent localized overheating of the conductive resin.

11 Claims, 3 Drawing Sheets

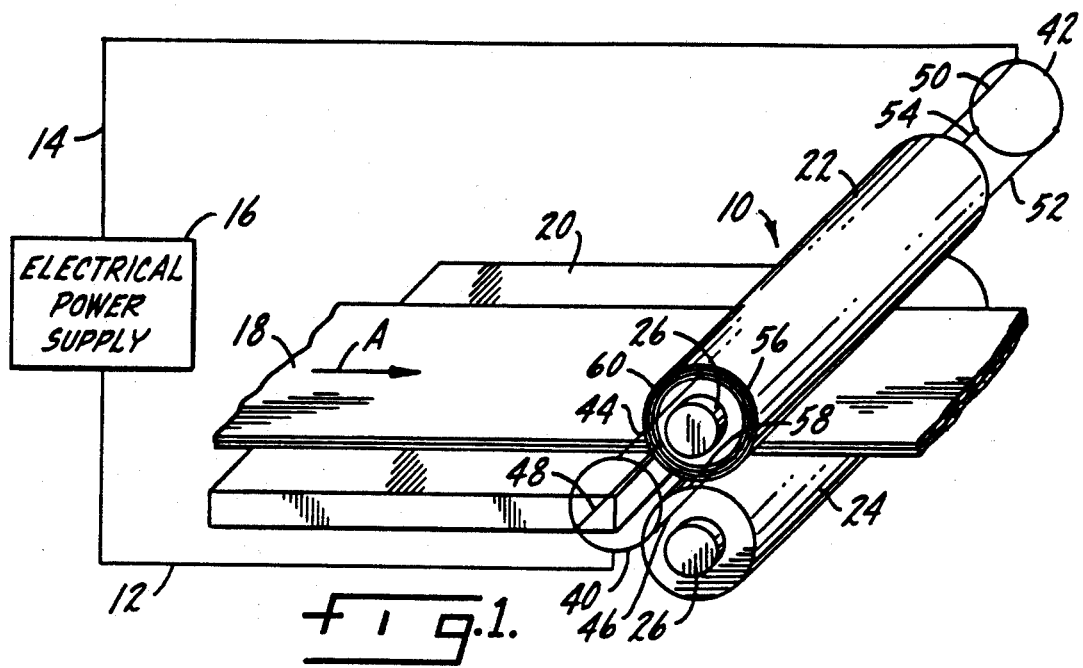
Fig. 1.
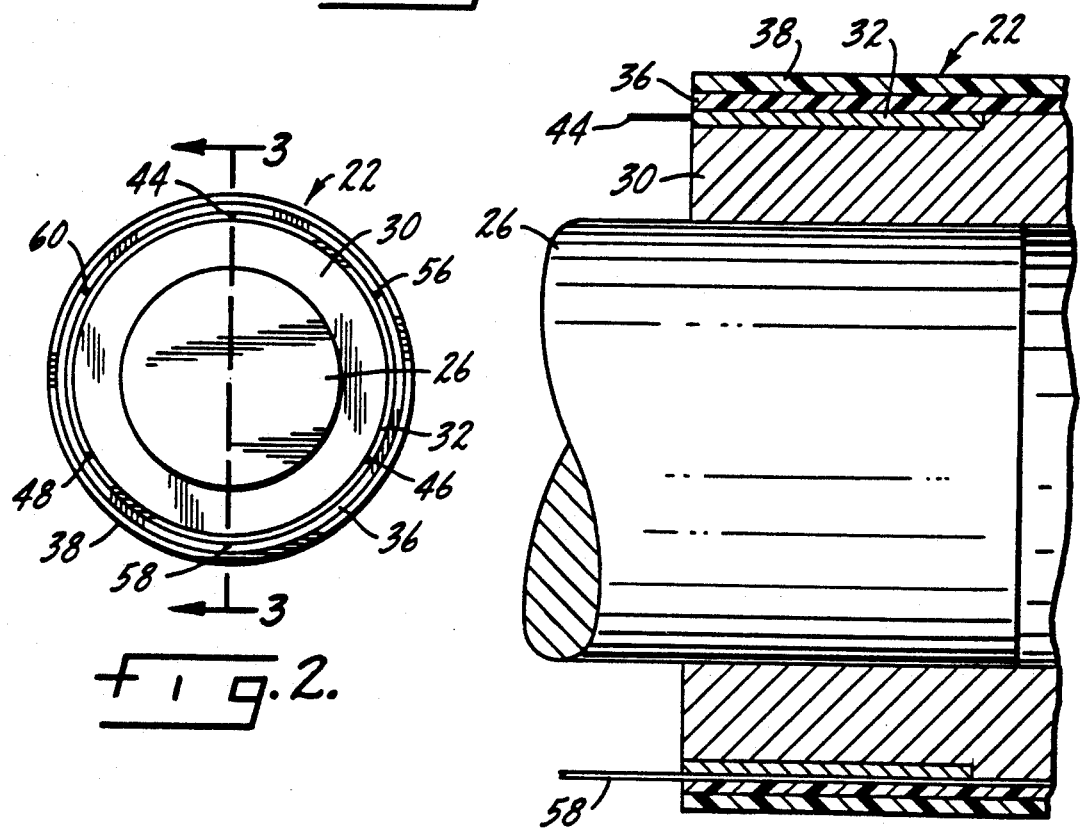
Fig. 2.
Fig. 3.

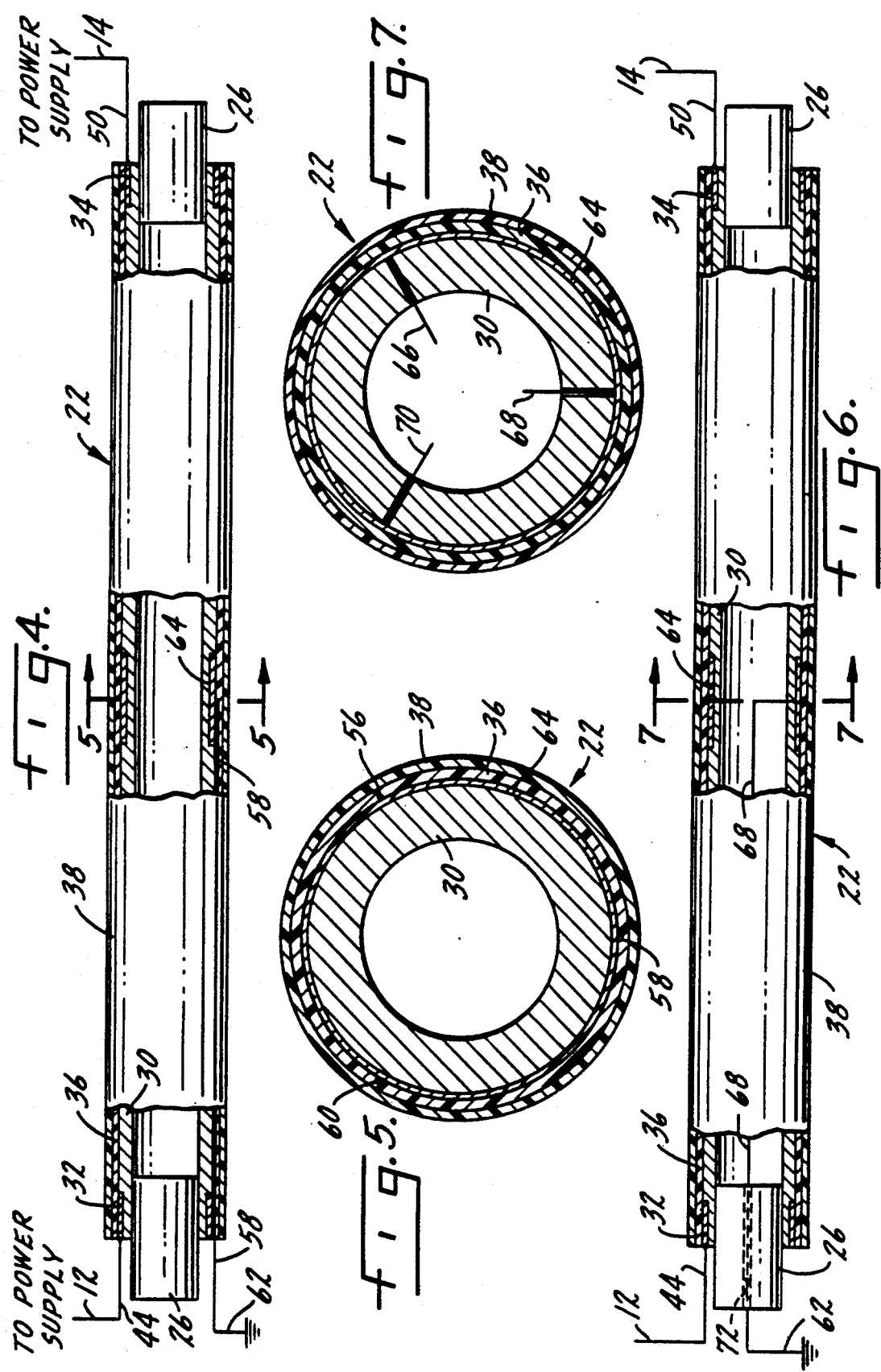

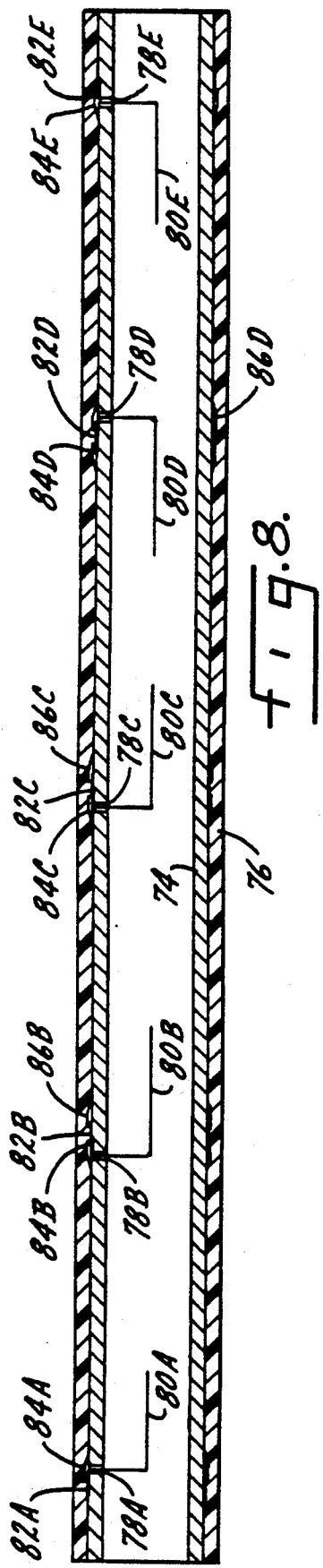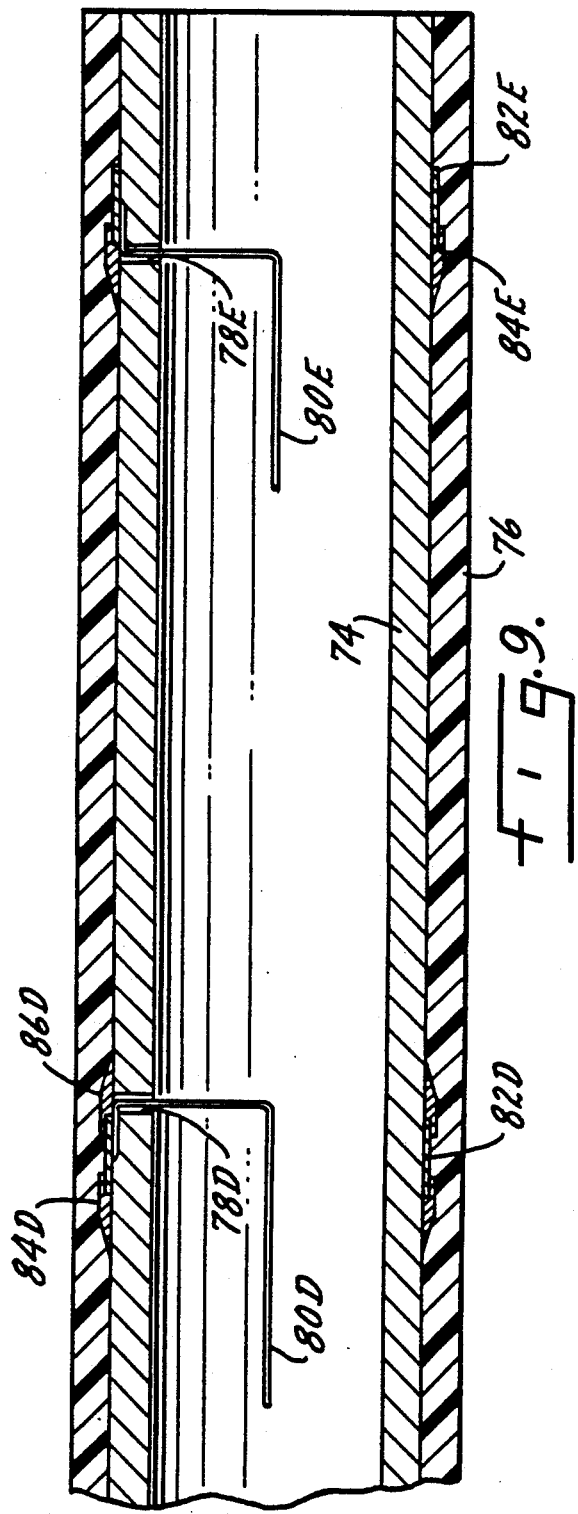

RESISTIVE CONTACT FOR RESIN-BASED HEATING ELEMENTS

BACKGROUND OF THE INVENTION

This invention relates to plastic film laminators of the type used for applying protective coverings to drivers licenses, identification cards, menus, photographs and other products. The protective covering is formed of laminated plastic film. Such products typically comprise a paper card or the like placed between layers of plastic film such as polyethylene-coated Mylar. The plastic layers extend somewhat beyond the edges of the card. When the edges of the plastic layers are sealed by heating a protective pocket is formed around the card.

Recent developments in plastic laminating machines include heating rollers using a conductive resin as the resistive heating element. The resin replaces wires that were traditionally wrapped or wound around the roller. An example of such a laminating machine is shown in my U.S. Pat. No. 5,081,340, the disclosure of which is incorporated herein by reference. The present invention is a further development in the field of resin-based heating elements and specifically concerns a contact for applying electric current to the layer of conductive resin.

SUMMARY OF THE INVENTION

The present invention is directed to an improved electrical contact for the heating element of a plastic laminating machine. A primary object of the invention is a contact that decreases current density at the interface of the contact and the conductive resin layer of a heating element, thereby preventing localized overheating of the resin and/or contact.

Another object of the invention is a resistive contact of the type described which has about the same sheet resistance as the conductive resin layer of a heating element.

A further object of the invention is a contact or set of contacts intermediate the ends of the heating element, thereby decreasing the length of the electrical circuit and making the properties of the resin less critical.

Other objects may become evident in the following specification, drawings and claims.

The heating element includes a relatively rigid base member, which may be either flat or cylindrical. The surface of the base member is non-conductive. This may be achieved by constructing the base from an insulating material such as plastic. Or an insulating layer of electrically non-conductive material may be applied to the surface of a metallic base member.

A heating layer of electrically conductive resin is formed on the insulating layer. The heating layer may be, for example, conductive silicone which is molded onto the base member. At least first and second resistive contacts are electrically connected to the conductive resin of the heating layer. The contacts have a sheet resistance within an order of magnitude of the sheet resistance of the conductive resin. This establishes a voltage gradient across the contacts, thereby spreading the current out over the entire surface of the contact. The contacts are electrically connectable to a power supply to form an electrical circuit with current passing through the heating layer of conductive resin.

BRIEF DESCRIPTION OF THE DRAWINGS

FIG. 1 is a perspective view of a portion of a heated roller laminating machine, showing a first embodiment of the resistive contacts of the present invention.

FIG. 2 is an end view of the heated roller.

FIG. 3 is an enlarged section of the end of the heated roller, taken along line 3—3 of FIG. 2.

FIG. 4 is a side elevation view, with parts in section, of the first embodiment of a heated roller with the resistive contacts of the present invention.

FIG. 5 is an enlarged section taken along line 5—5 of FIG. 4.

FIG. 6 is a side elevation view, with parts in section, of an alternate embodiment of a heated roller with the resistive contacts of the present invention.

FIG. 7 is an enlarged section taken along line 7—7 of FIG. 6.

FIG. 8 is a longitudinal section of a heating roller having an alternate form of electrical contact pad.

FIG. 9 is an enlarged section showing the right end of the roller of FIG. 8.

DETAILED DESCRIPTION OF THE INVENTION

FIGS. 1-5 illustrate one embodiment of the present invention in the heated roller type of laminator. The heated roller shown generally at 10 is electrically connected by lines 12 and 14 to a power supply 16 (either ac or dc). Plastic film 18 to be laminated moves over an unheated support 20 in the direction of arrow A. The support 20 may optionally be heated or it could be deleted from the structure entirely. The plastic is compressed between rotating heated roller 22 and a lower roller 24. The lower roller may or may not be heated. The rollers are supported on shafts 26.

The heated roller 22 includes a cylindrical core 30 that could be formed of steel or other suitable material. The core has a hollow center for receiving shafts 26 or journals. The core 30, if it is made of a conductive material, is coated with an insulating layer. The insulating layer could be a non-conductive silicone resin or any other insulation coating.

Contact means in the form of first and second pads 32 and 34 (FIGS. 3 and 4) are disposed on the ends of the core 30. A heating layer 36 formed of a conductive resin (preferably an electrically conductive silicone as set forth in the 5,081,340 patent) overlies the contact pads. The pads 32, 34 provide a connecting point for electrical leads connected to the power supply. The pads are made of resistive material having a sheet resistance about equal that of the heating layer 36. That is, the sheet resistances of the pads and heating layer are within an order of magnitude of one another.

There is an outer layer 38 on the roller 22. It is preferably an insulator but one with reasonably good thermal conductivity. A silicone resin could be used, but others may prove satisfactory. For illustrative purposes only, on a 2-inch diameter core, the thickness of the heating layer 36 could be about 0.100 inches. The outer layer thickness could be about half that.

The electrical connections for the heated roller include slip rings 40, 42 (FIG. 1) attached at the ends of the roller for rotation therewith. Brushes are provided on the ends of power lines 12, 14 in sliding contact with the slip rings 40 and 42. The slip ring 40 is electrically connected to contact 32 by electrical leads 44, 46 and 48, while slip ring 42 is similarly connected to contact 34 by leads 50, 52 and 54. The slip rings 40, 42 and electrical leads 44–54 rotate with the roller 22. It will be understood that the number of leads 44–54 could be either higher or lower than as shown, depending on the requirements of a particular heating element.

The power supply 16 outputs the line voltage on each line 12, 14. Ground connections are provided by lines 56, 58 and 60. These lines rotate with the roller and are connected to a third slip ring, shown schematically at 62 in FIG. 4, which in turn is connected so as to complete the circuit. The lines 56–60 are embedded in the resin heating layer 36 and extend to a central portion of the roller. There the lines 56–60 are attached to a ground contact 64. Contact 64 is made of the same material as contacts 32 and 34.

Locating the ground contact 64 at the center of the roller has the advantage of decreasing the circuit length through the conductive resin of the heating layer. This shortened length makes the characteristics of the resin less critical to proper heating of the roller.

FIGS. 6 and 7 illustrate an alternate embodiment of the invention. This embodiment differs from the previous one only in the layout of the ground wires. Here the ground wires 66, 68 and 70 extend through an aperture 72 in the shaft 26 into the hollow interior of the core 30. The wires connect to contact 64 through holes in the core, as best seen in FIG. 7.

FIGS. 8 and 9 illustrate a further embodiment of the invention. In this form a cylindrical core 74 has a conductive resin heating layer 76. An outer layer (not shown) covers the heating layer. A plurality of access openings 78A–E are spaced at intervals along the length of the core. There are five such openings shown but the number could vary. Electrical lead wires 80A–E extend from slip rings (not shown but similar to slip rings 40, 42) into the interior of the core 74. The lead wires 80 gain access to the core interior through openings in the support shafts, similar to the arrangement at 72 in FIG. 6. The interior ends of the lead wires extend through the access openings 78 with their tips folded flush against the outside surface of the core. Here the lead wires are soldered to a contact means.

The contact means comprises a band or ring 82 of copper tape bounded by one or two resistive elements 84, 86. The copper tape is about one quarter inch wide and 0.010 inches thick. It serves as an equipotential surface delivering current to resistive elements 84 and 86. Reference numerals 82, 84 and 86 refer to the contact means components collectively. There are five separate contact means shown in FIGS. 8 and 9. Individual components of the contact means are indicated in the drawings with a letter designation, i.e., copper tapes 82A–82E and resistive elements 84A–84E and 86B–86D.

The resistive elements 84 are formed at one edge of the copper bands 82. The center three copper bands 82B–D also have a second resistive element 86B–D opposite elements 84B–D. The dimensions of the resistive elements are exaggerated in the drawings so they can be seen. All resistive elements 84 and 86 are made of resistive ink, also known as thick-film ink or resistive paste. As in the case of the contact pads described above, the sheet resistance of the resistive elements 84, 86 is within an order of magnitude of the sheet resistance of the conductive resin.

It can be appreciated that the embodiment of FIGS. 8 and 9 provides a good deal of flexibility in the circuit arrangement. Each contact means could be connected as needed to power or ground to achieve the desired heating. For example, contacts A, C and E could be power connection while contacts B and D are ground connections. Or different zones of the roller could be supplied with different voltages to provide variable heating.

While particular embodiments of the invention have been shown and described, it will be realized that alterations or modifications may be made thereto without departing from the scope of the following claims. For example, while the discussion herein shows a cylindrical heating element, the resistive contact of the present invention can be adapted for flat platen heaters as well as heated rollers. Also, instead of taking the ground tap at the center of the roller it could be at the end. That is, one end of the roller would receive the positive voltage and the other end would be grounded. Furthermore, there may be any number of intermediate contacts along the axis of current flow, and these contacts may be of either polarity. The invention is not limited to three contacts. The purpose of additional contacts, as mentioned above, is to make the properties of the resin less critical. Another purpose of additional contacts is to allow for a more precise temperature profile along the axis of the roller, and minimizing temperature "droop" at the ends.

I claim:

1. In a heating element for a plastic film laminator of the type having a relatively rigid base member, a heating layer of electrically conductive resin formed on the base member, and contact means electrically connected to the conductive resin of the heating layer and electrically connectable to a power supply such that an electrical circuit is formed with current passing through the heating layer of conductive resin, improved contact means comprising pads of resistive material having a sheet resistance within an order of magnitude of the sheet resistance of the conductive resin.

2. The structure of claim 1 wherein the contact means are disposed between the base member and the heating layer.

3. The structure of claim 2 wherein at least one of the contact means extends to an edge of the base member so that an edge surface of the contact means is exposed for connection to the power supply.

4. The structure of claim 1 wherein the contact means comprises a band of copper tape and at least one resistive element formed of resistive ink.

5. A heating element for a plastic film laminator, comprising:
   a relatively rigid base member having first and second ends;
   a heating layer of electrically conductive resin formed on the base member;
   first and second spaced, electrical contact means electrically connected to the conductive resin of the heating layer, said contact means being electrically connectable to a power supply such that an electrical circuit is formed with current passing from the first contact means, through the heating layer of conductive resin to the second contact means, the power and ground contacts comprising pads of resistive material having a sheet resistance within an order of magnitude of the sheet resistance of the conductive resin.

6. The structure of claim 5 further comprising at least one insulated lead wire electrically connected to one of the contacts, the lead wire being embedded in the heating layer.

7. The structure of claim 5 wherein the base member is a hollow, cylindrical member.

8. The structure of claim 7 further comprising at least one insulated lead wire electrically connected to one of the first or second contacts, the lead wire being disposed in the hollow center of the base member and extending through an opening in the base member to electrically connect to said one contact.

9. The structure of claim 5 wherein at least one of said electrical contacts comprises a band of copper tape and at least one resistive element formed of resistive ink.

10. The structure of claim 9 further comprising at least one lead wire electrically connected to said band of copper tape, the lead wire being disposed in the hollow center of the base member and extending through an opening in the base member to electrically connect to said band.

11. The structure of claim 10 wherein the lead wire is soldered to the band of copper tape.

* * * * *